United States Patent Office 3,769,435
Patented Oct. 30, 1973

3,769,435
METHOD OF FUMIGATING INSECTS USING 2 - CHLOROMETHYL - 1,3-POLYFLUORO-2-PROPANOLS
Robert E. A. Dear and Everett E. Gilbert, Morris Township, Morris County, N.J., assignors to Allied Chemical Corporation, New York, N.Y.
No Drawing. Original application May 20, 1969, Ser. No. 826,127, now Patent No. 3,616,360, dated Oct. 26, 1971. Divided and this application Oct. 18, 1971, Ser. No. 190,268
Int. Cl. A01n 9/24
U.S. Cl. 424—343      8 Claims

ABSTRACT OF THE DISCLOSURE 2-chloromethyl-1,3-polyfluoro - 2 - propanols and their fluorinated derivatives are useful as fumigants against insects.

---

This is a division of application Ser. No. 826,127, filed May 20, 1969, now U.S. Pat. 3,616,360.

This invention relates to a new method for preparing 2-chloromethyl-1,3-polyfluoro-2-propanols and more specifically to a new method for preparing 2-trichloromethyl-1,1,1,3,3,3-hexafluoro-2-propanol.

In the past 2-trichloromethyl-1,1,1,3-3-3-hexafluoro-2-propanol of the formula

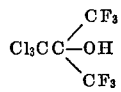

has been prepared by reacting hexafluoroacetone and trichloromethyl lithium in a medium of tetrahydrofuran at temperatures not above about —100° C. This prior art process has been used only on a small laboratory scale, and is obviously unsuited for large scale commercial practice for the following reasons:

(1) The exceedingly low temperature required would necessitate very expensive equipment to maintain the frigid reaction conditions.

(2) Trichloromethyl lithium is stable only at —100° C. and below, and only in tetrahydrofuran solvent. Attempts to prepare this reagent in other solvents have been unsuccessful.

(3) The instability of the trichloromethyl lithium to heat and moisture makes it necessary to prepare the reaction equipment with great care, including exhaustive drying to remove water. It is also necessary to purge with inert gas to ensure absence of carbon dioxide which, if present, would react preferentially with the trichloromethyl lithium.

(4) Finally, the product of the prior art process is produced in the form of a stable complex of 2-trichloromethyl-1,1,1,3,3,3-hexafluoro-2-propanol and tetrahydrofuran which can be broken only by application of a strong acid such as hot concentrated sulfuric acid which adds a further troublesome and expensive step to the prior process.

It has been proposed to chlorinate tertiary butyl alcohol (2-methyl-2-propanol) by heating the alcohol with chlorine in the presence of an alkaline compound such as chalk, whereby mono, di and trichlorotertiary butyl alcohols are produced. When this technique is applied to hexafluorotertiary butyl alcohol (2 - methyl-1,1,1,3,3,3-hexafluoro-2-propanol) or to tetrafluorodichlorotertiary butyl alcohol (2 - methyl - 1,1,3,3 - tetrafluoro-1,3-dichloro-2-propanol), no reaction whatever appears to take place, and no chlorine substitution occurs.

It is an object of the present invention to provide a simple and inexpensive process, adapted for commercial use, for preparing 2 - chloromethyl - 1,3 - polyfluoro-2-propanols and especially 2 - trichloromethyl-1,1,1,3,3,3-hexafluoro-2-propanol.

These and other objects are accomplished according to our invention wherein a mixture of a 2-methyl-1,3-polyfluoro - 2 - propanol or a 2-mono- or dichloromethyl-2-propanol and elemental chlorine are subjected to the action of a broad band of ultraviolet light in the wave length range between about 2000 A. and about 3600 A. at a temperature of between about 10° C. and about 200° C.

The reaction according to our invention proceeds as follows:

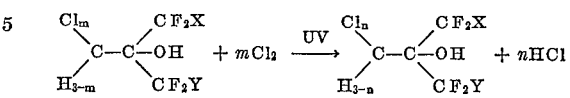

wherein $m$ is an integer from 0 to 2 inclusive, $n$ is an integer from 1 to 3 inclusive and X and Y are the same or different members of the group consisting of fluorine and chlorine.

Specific 2-methyl-1,3-polyfluoro-2-propanols usable as starting materials in our process include the following:

(I) 2-methyl-1,1,1,3,3,3-hexafluoro - 2 - propanol of the formula

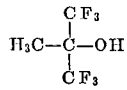

(II) 2-monochloromethyl - 1,1,1,3,3,3 - hexafluoro-2-propanol of the formula

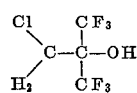

(III) 2-dichloromethyl - 1,1,1,3,3,3 - hexafluoro-2-propanol of the formula

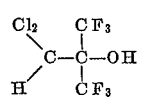

(IV) 2-methyl - 1,1,3,3,3 - pentafluoro-1-chloro-2-propanol of the formula

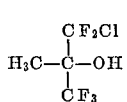

and the 2-monochloromethyl and 2-dichloromethyl derivatives of the above compound (V) 2-methyl - 1,1,3,3 - tetrafluoro - 1,3-dichloro-2-propanol of the formula

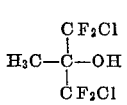

and the 2-monochloromethyl and 2-dichloromethyl derivatives of the above compound.

For the starting alcohols containing three hydrogens in the 2-methyl group, chlorination can be carried out so as to replace one, two or three hydrogens in the —CH$_3$ group by chlorine and the lower chlorinated compounds can either be recovered as such or used to carry out further chlorinations. Accordingly, the compounds produced according to our invention include those of the general formula shown below

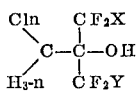

wherein $n$ is an integer from 1 to 3, X and Y are the same or different members of the group consisting of fluorine and chlorine.

When three chlorines are to be introduced, the overall process according to our invention proceeds as follows

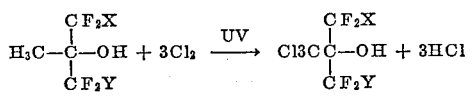

The process of our invention can be carried out either in the liquid phase or in the vapor phase as long as the indicated irradiation is provided and the reactants are maintained at the indicated reaction temperatures. We prefer however, to carry out the chlorination in the liquid phase, particularly when the desired end product is the trichlorinated alcohol, since more rapid and complete conversions are obtained by this method. When intermediate mono- and di-chlorinated products are to be recovered as end products, vapor phase reaction is preferred.

The process of our invention can be carried out either batchwise or continuously and appropriate apparatus is readily available for carrying out our photochemical reaction in either manner using immersion type ultraviolet sources.

In carrying out the process, the 2-methyl-1,3-polyfluoro-2-propanol starting alcohol is mixed with elemental chlorine and the resulting mixture is irradiated at temperatures between about 10° C. and about 200° C. with a broad band of ultraviolet light in the wave length range between about 2000 A. and about 3600 A.

The ultraviolet light can be supplied in any desired manner. For example, if the reaction vessel is of ultraviolet light-transparent material such as quartz, the UV source can be positioned outside the vessel. Preferably, the ultraviolet light source is positioned inside the reaction vessel, for example, encased in a water-cooled quartz well or other conventional device for supplying ultraviolet irradiation.

When operating batchwise in the liquid phase, the starting alcohols, which are all liquids at ordinary room temperatures (ca. 20–25° C.), are placed in a reaction vessel, and chlorine is introduced into the liquid as by bubbling chlorine gas through the liquid while irradiating the mixture with ultraviolet light in the indicated wave length range.

If the process is to be carried out continuously in the liquid phase, this can be accomplished by passing the chlorine/alcohol mixture through a conventional irradiation apparatus, for example a falling film type reactor wherein the liquid mixture to be irradiated is fed into an elongated glass tube onto the top of a rotating disc which whirls the liquid to the walls of the tube. The film of liquid thus formed falls down the inner walls of the tube, passing vertically past an ultraviolet irradiation lamp, suitably positioned vertically within the tube. The irradiated liquid is lead out of the bottom of the reactor tube and is either collected if reaction is complete, or is recirculated one or more times if necessary to complete the chlorination reaction.

When employing vapor phase chlorination, a mixture of chlorine gas and vaporized 2-methyl-1,3-polyfluoro-2-propanol is irradiated with ultraviolet light of the indicated wave lengths either in a continuous reactor through which the mixtuer is passed, or in a batch reactor in which the mixture is maintained in an irradiated zone at a temperature above the boiling point of the 2-methyl-1,3-polyfluoro-2-propanol, i.e. sufficiently high to maintain the reactants in the vapor state.

By-product hydrogen chloride which forms during the course of the chlorination reaction is inert to both reactants and reaction products and, due to its high volatility, can readily be separated from the reaction mass either continuosly during the course of the reaction or by distillation after its completion.

Amount or intensity of irradiation is not unduly critical, as long as the required broad band of wave lengths between about 2000 A. and about 3600 A. is provided. Greater intensity of irradiation or the provision of a plurality of lamps will tend to shorten the time for completion of the chlorination somewhat, but do not appreciably influence the quality of the overall conversion.

Rate of chlorination under the influence of the ultraviolet light is relatively rapid, and depends on the area of the alcohol irradiated, the manner of carrying out the reaction and the degree of chlorination desired. In continuous operation wherein a thin moving stream of chlorine-alcohol mixture is subjected to the ultraviolet irradiations, residence times of a few seconds, e.g. about 5 seconds, are sufficient to provide an appreciable yield of chlorinated products. Complete chlorination to the trichlorinated product requires a somewhat longer exposure, for example at least about 10 seconds. In general irradiation is carried out for a period sufficient to provide at least substantial monochlorination, preferably a period between about 5 seconds and about 24 hours and preferably long enough to provide substantial trichlorination of the 2-methyl group.

The amount of chlorine used will be at least that stoichiometrically required to produce the desired chlorinated end product. An excess of chlorine does no harm and is readily recoverable. Rate of chlorine feed to the mixture will usually be at the rate the chlorine reacts with the alcohol under the conditions of the particular run.

Individual compounds which can be prepared according to the process of our invention include the following:

(VI) 2-trichloromethyl-1,1,1,3,3,3-hexafluoro-2-propanol
(VII) 2-dichloromethyl-1,1,1,3,3,3-hexafluoro-2-propanol
(VIII) 2-monochloromethyl-1,1,1,3,3,3-hexafluoro-2-propanol
(IX) 2-trichloromethyl-1,1,3,3,3-tetrafluoro-1,3-dichloro-2-propanol
(X) 2-dichloromethyl-1,1,1,3,3-tetrafluoro-1,-dichloro-2-propanol
(XI) 2-monochloromethyl-1,1,1,3,3-tetrafluoro-1,3-dichloro-2-propanol
(XII) 2-trichloromethyl-1,1,1,3,3-pentafluoro-1-monochloro-2-propanol
(XIII) 2-dichloromethyl-1,1,1,3,3-pentafluoro-1-monochloro-2-propanol
(XIV) 2-monochloromethyl-1,1,1,3,3-pentafluoro-1-monochloro-2-propanol Temperature of irradiation should be at least about 10° C., since at lower temperatures chlorine substitution is extremely slow and, moreover, the starting alcohol may freeze. On the other hand, temperatures in excess of about 200° C. tend to cause decomposition of the chlorinated reaction products. Reaction temperatures therefore will be between about 10° C. and about 200° C., preferably between about 50° C. and about 150° C. If carried out in the liquid phase, the reaction temperature will preferably be below the atmospheric boiling points of the starting materials. If carried out in the vapor phase, reaction temperatures will be above the boiling points of the reactants.

Approximate boiling points of the starting alcohols and corresponding trichlorinated products are shown in Table I below.

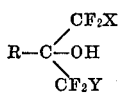

TABLE I

Approximate boiling points of starting and product alcohols of formula

| Value of— | | | Boiling point, °C. | Value of— | | | Boiling point, °C. |
|---|---|---|---|---|---|---|---|
| R | X | Y | | R | X | Y | |
| CH₃ | F | F | 61 | CH₃ | F | Cl | 89 |
| CClH₂ | F | F | 89 | CCl₃ | F | Cl | 165 |
| CCl₂H | F | F | 115 | CH₃ | Cl | Cl | 118 |
| CCl₃ | F | F | 135 | CCl₃ | Cl | Cl | 195 |

The compounds prepared by our process from 2-methyl-1,1,1,3,3,3-hexafluoro-2-propanol to contain either 1,2 or 3 chlorines on the 2-methyl carbon are effective per se as fumigants for insects which infest stored products such as grain, including confused flour beetle (*Tribolium confusum*), black carpet beetle (*Attagenus piceus*), and yellow meal worm (*Tenebrio molitor*). These compounds are also effective fumigants against nematodes. On the other hand, the compounds prepared by chlorination of 2-methyl-1,1,3,3-tetrafluoro-1,3-dichloro-2-propanol do not possess fumigant activity.

All the compounds of our invention, however, can be converted into highly fluorinated compounds of superior fumigant activity by fluorination using SbF₅ as the fluorinating agent, in which case every chlorine atom in the molecule is replaced by fluorine, viz.

(1) 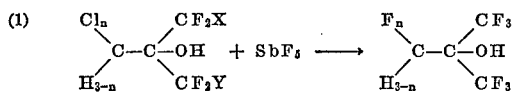

All of the fluorinated compounds thus obtained are highly effective fumigants against insects which infest stored food products such as grain and against nematodes, and are all significantly more toxic than the corresponding chlorinated compounds from which they are prepared.

The compounds prepared according to the process of our invention can also be fluorinated using SbF₃+SbCl₅ together, in which case only chlorines on the 2-methyl carbon are converted to fluorine, and in any case produce fluorinated compounds with no more than two fluorine atoms on the 2-methyl carbon, viz.

(2) 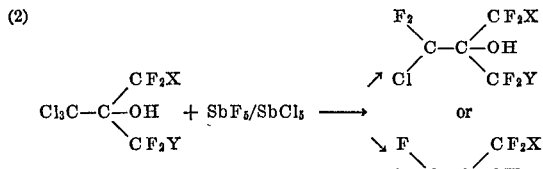

(3) 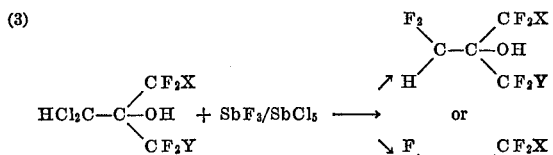

(4) 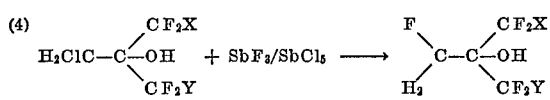

Of the compounds obtained by the above fluorination procedures (Equations 2-4), the compound

(Equation 2), was found to have selective fumigant activity against nematodes and confused flour beetles.

Of especial interest among the compounds which can be prepared according to our new process is 2-trichloromethyl-1,1,1,3,3,3-hexafluoro-2-propanol because of its ready conversion to the corresponding 2-trifluoromethyl-1,1,1,3,3,3-hexafluoro-2-propanol, which we have found has exceptionalyy high utility as a fumigant for insects which infest stored food products such as grain and also as a fumigant against nematodes, such fumigant activity being exhibited even at extremely low concentrations of the toxicant. This superiority in fumigant activity of the highly fluorinated compound over that of the corresponding 2-trichloromethyl compound is very surprising, as, in general, chlorine substituted compounds have heretofore shown superiority in toxicity to biological pests, over that of their fluorine substituted counterparts.

The 2-chloromethyl- and 2-fluoromethyl-1,3-polyfluoro-2-propanols which we have found to have excellent toxicity in their vapor forms against insects, especially against insects which infest stored products such as grain, have the formula

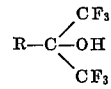

wherein R is a member selected from the group consisting of —CCl₃, —CHCl₂, —CH₂Cl, —CF₃, —CF₂Cl and —CFCl₂.

Selectively effective against the confused flour beetle and against nematodes is the compound

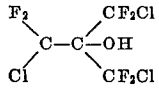

prepared by flourinating 2-trichloromethyl-1,1,3,3-tetrafluoro-1,3-dichloro-2-propanol as illustrated in Equation 2 herein.

Fumigation with the toxic 2-halomethyl-1,3-polyfluoro-2-propanols is carried out according to conventional fumigation practices by exposing the organism to the vapor of the toxicant. This is usually accomplished by placing a small amount of the liquid toxicant in the space to be fumigated, or by injecting relatively small amounts into the body of the material to be treated, such as grain or the like, and permitting the toxicant to vaporize, thus subjecting the organism to be controlled to the vapors of the toxicant for a period sufficient to rid the space of pests. If desired, the toxicant may be initially applied in vapor form.

The following specific examples further illustrate the invention.

EXAMPLE 1

Vapor phase chlorination of H₃CC(CF₃)₂OH 2-methyl-hexafluoro-2-propanol, B.P. 61° C., in the amount of 150 grams (0.824 mol) was vaporized from a heated flask into the reaction zone of a vapor phase reactor fitted with a quartz mercury vapor lamp (Hanovia 450 W) delivering ultraviolet light of wave lengths in the range between 200 A. and 3600 A., the lamp being located within a quartz (Vycor) water cooled well (maintained at about 20° C.). Chlorine gas was fed into the reactor over a period of 21 hours, mixing with the alcohol and under illumination by the ultraviolet light at an average rate of about 10 grams per hour until 205 grams (2.89 mols) of chlorine had been introduced. During introduction of chlorine, the chlorinated product in the vaporous reaction mass, coming in contact with the cool walls of the water cooled well (20° C.) was condensed and returned to the heated flask. Continued application of heat to the flask produced continued vaporization of remaining starting alcohol. By-product HCl was continuously removed as a vapor from the top of the reaction zone. The temperature rose over the reaction period from 64° to 100° C. The rate of consumption of chlorine at this time had become extremely slow. The flask was removed and the resulting crude product was separated by distillation into three fractions identified below 1. B.P. up to 65° C____ 37 g. unreacted CH₃C(CF₃)OH.
2. B.P. 65–135° C____ 16 g. mixture of CH₃C(CF₃)₂OH, ClCH₂C(CF₃)₂-OH, Cl₂CHC(CF₃)OH and Cl₃CC(CF₃)OH.
. B.P. 135–136° C____ 127 g. product Cl₃CC(CF₃)₂OH, a yield of 72%

The structure of the product 2-trichloromethyl-1,1,1,3,3,3 - hexafluoro-2-propanol (Fraction 3) was confirmed first by comparison of its infrared spectrum with that described by Filler and Schure (J. Org. Chem. 32, 1217 (1967)); second by its conversion to $(F_3C)_3COH$ and third by mass spectral analysis.

EXAMPLE 2

Vapor phase chlorination of $H_3CC(CF_2Cl)_2OH$

In the manner described in Example 1 above, one mol of 2-methyl-1,1,3,3-tetrafluoro-1,3-dichloro - 2 - propanol (B.P. 118° C.) was irradiated in the vapor phase in admixture with chlorine gas in the wave length range of 2000 A. and 3600 A., introduction of chlorine gas being continued until virtually no further absorption of chlorine was taking place, a period of about 20–24 hours. The resulting product was distilled and provided a 70% yield of 2-trichloromethyl-1,1,3,3-tetrafluoro - 1,3 - dichloro-2-propanol product of the formula

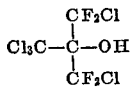

boiling point 108° C. at 33 mm. Hg.

Elemental analysis showed: Calculated (percent): C, 15.1; H, 0.32; Cl, 55.69. Found (percent): C, 15.38; H, 0.46; Cl, 55.95.

The structure of the product was confirmed by nuclear magnetic resonance examination.

EXAMPLE 3

Vapor phase chlorination of $H_3CC(CF_3)(CF_2Cl)OH$

In the manner described in Example 1 above vapors of 2-methyl-1,1,1,3,3-pentafluoro-3-chloro - 2 - propanol vapor and chlorine gas are reacted under illumination with ultraviolet light of wave length 2000–3600 A. until virtually no further absorption of chlorine occurred. Upon distillation, the mixture yields the product 2-trichloromethyl - 1,1,1,3,3-pentafluoro-3-chloro-2-propanol of the formula

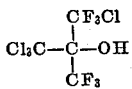

EXAMPLE 4

Liquid phase chlorination of $H_3CC(CF_3)_2OH$

Two hundred grams of 2-methyl-hexafluoroisopropanol were placed in a 250 ml. quartz flask fitted with a magnetic stirrer, a sintered glass gas inlet and a Dry Ice reflux condenser. A quartz mercury vapor lamp (Hanovia 450 W) delivering a broad band of ultraviolet light of wave lengths in the range between 3600 A. and 2000 A. was placed at one side of the flask at a distance of about 30 mm. from the outside of the flask below the level of the liquid alcohol in the flask. At ambient temperature of about 25° C. chlorine gas was fed through the sintered glass gas inlet for a period of about 2 hours at a rate of about 10 grams per hour while irradiating the reaction mixture with UV light from the lamp. Examination of the reaction mixture by gas-liquid chromatography at this point revealed the presence of considerable monochlorinated product $H_2ClCC(CF_3)_2OH$ and traces of di- and trichlorinated product. Chlorine feed was continued at the same rate for 5 additional hours, at which time examination by gas-liquid chromatography revealed the presence of substantial proportions of the trichlorinated product $CCl_3C(CF_3)_2OH$ in admixture with smaller proportions of the mono- and dichlorinated products. After an additional 9 hours, GLC examination showed that the crude liquid in the flask consisted entirely of the trichloro product $Cl_3CC(CF_3)_2OH$.

Distillation of the crude product yielded 266.5 grams of pure $Cl_3CC(CF_3)_2OH$, B.P. 136° C., equivalent to a yield of 85.5% based on the starting alcohol. In addition 15.5 grams of impure trichloro alcohol was recovered from the fore fraction bringing the yield to approximately 90% of theory.

EXAMPLE 5

Liquid phase chlorination of $H_3CC(CF_2Cl)_2OH$

In a quartz Erlenmeyer flask equipped with a magnetic stirrer, a sintered glass gas inlet and Dry Ice reflux condenser was placed 65.9 grams (0.308 mol) of 1,1-bis (chlorodifluoromethyl) ethanol (B.P. 118° C.). A quartz mercury vapor lamp (Hanovia 450 W) delivering ultraviolet light of wave lengths in the range between 2000 A. and 3600 A. was placed at a distance of about 30 mm. from the outside of the flask below the level of the liquid alcohol therein. At ambient temperature chlorine was fed into the liquid alcohol through the sintered glass inlet, while irradiating the liquid by means of the mercury vapor lamp. After 3 hours irradiation, and chlorine introduction, examination of the reaction mass by gas-liquid chromatography showed the presence of mono-, di- and trichloroalcohols. Periodic examinations of the reaction mass during continued irradiation and chlorination showed continued smooth progress of the mixture to the trichlorinated product. After 12½ hours and the absorption of 78 grams of chlorine, the reaction was stopped. The crude product was then distilled and yielded the following fractions.

(1) forerun up to 110° C.
(2) B.P. 45°/25 mm.–93°/25 mm.: 7.9 grams
(3) B.P. 93°/25 mm.–96°/25 mm.: 70.1 g. pure product
(4) residue: 2 grams The 70.1 grams of pure product (fraction 3) is equivalent to a 71.5% yield of $CCl_3C(CF_2Cl)_2OH$ based on the starting alcohol consumed.

EXAMPLE 6

Fluorination of $Cl_3CC(CF_3)_2OH$ with $SbF_5$

Antimony pentafluoride (276.5 grams, 1.27 mols) was placed in a 500 ml. flask fitted with a drooping funnel, thermometer, mechanical stirrer, take-off head, condenser and cooled receiver. Then 118.6 grams (0.415 mol) of 2 - trichloromethyl-1,1,1,3,3,3-hexafluoro-2-propanol was added slowly, dropwise with stirring and occasional ice bath cooling to maintain the flask temperature at about 35°–40° C. After all the alcohol had been added, the resulting pale, yellow green solution was stirred at ambient temperature (Ca. 25° C.) then warmed gently with an oil bath held at 60°–65° C. The fluorinated product distilled from the flask between 40° and 48° C. and was collected in the cooled receiver. When no more distillation was apparent, the temperature of the oil bath was raised to 80°–85° C., then to 105°–110° C., and at each stage more product was collected. The temperature was finally raised to 150° C. but very little further product distilled at this temperature. The final distillate weighed 90.2 grams and was found by gas-liquid chromatography examination to be pure tri(trifluoromethyl) carbinol $(F_3C)_3COH$, representing a yield of 92% based on the chlorinated reactant.

EXAMPLE 7

Fluorination of Cl₃CC(CF₃)₂OH with SbF₃/SbCl₅

Antimony trifluoride (71.5 grams, 0.4 mol) and antimony pentachloride (10 ml.) were mixed in a 250 ml., 3-necked flask equipped with a stirrer, a reflux condenser, a thermometer and a dropping funnel. Then, at ambient temperature (Ca. 25° C.) and with stirring, trichloromethyl - 1,1,1,3,3,3 - hexafluoro-2-propanol (38 grams, 0.113 mol) was added slowly. The resultant slurry was heated until a steady reflux was obtained (100°–105° C.) and this condition was maintained with vigorous stirring for 30 minutes. The mixture was then cooled to about 30° C. and then distilled to remove the resulting fluorinated products by distillation. The crude product was redistilled through a spinning band column and yielded 3 grams of ClF₂CC(CF₃)₂OH, B.P. 72° C. and 19.9 grams of Cl₂FCC(CF₃)₂OH, B.P. 103–104° C. The structure of the major product Cl₂FCC(CF₃)₂OH was confirmed by infrared and nuclear magnetic resonance spectroscopy and by elemental analysis, the latter shown below.

Calculated (percent): C, 17.99; H, 0.38; Cl, 26.56. Found (percent): C, 17.72; H, 0.38; Cl, 26.47.

Structure of the minor product was confirmed by comparing its properties to those reported by Filler and Schure.

EXAMPLE 8

The chlorinated compounds prepared according to our invention, as well as their corresponding fluorinated derivatives, were tested for their fumigant activity against insects which infest stored food products such as grain including confused flour beetle (*Tribolium confusum*), black carpet beetle larvae (*Attagenus piceus*) and yellow meal worm larvae (*Tenebrio molitor*). Toxic action against nematodes is also shown in some cases.

In carrying out the fumigant tests, ten insects of each species are placed in 1.5 inch diameter salve tins with perforated lids. A small amount of appropriate food is placed in each tin. The tins are placed in gallon jars and the appropriate dosages of toxicant to provide a vapor concentration of toxicant of about 8 ounces per 1,000 cubic feet or less, are placed on cellucotton wads in the jars which are then sealed. After 24 hours exposure, insect containers are removed from the jars and mortality counts are made 5 days after the start of the test.

Results are shown in Table II below in comparison with similar tests made using the unchlorinated starting material and tests using no toxicant.

TABLE II

| Compound | Dose, oz./1,000 ft.³ | CFB | BCB | YMW | NEM |
|---|---|---|---|---|---|
| CH₃C(CF₃)₂OH | 8 | 80 | 40 | 40 | <5 |
|  | 4 | 40 | 0 | 0 | <5 |
| CH₂ClC(CF₃)₂OH | 8 | 100 | 100 | 100 | 95 |
|  | 4 | 100 | 40 | 60 | 10 |
| CHCl₂C(CF₃)₂OH | 8 | 100 | 100 | 100 | 100 |
|  | 4 | 100 | 100 | 100 | 98 |
|  | 2 | 0 | 0 | 0 | <5 |
|  | 1 | 0 | 0 | 0 | <5 |
| CCl₃C(CF₃)₂OH | 8 | 100 | 100 | 100 | 100 |
|  | 4 | 100 | 100 | 100 | 100 |
|  | 2 | 0 | 0 | 0 | <10 |
|  | 1 | 0 | 0 | 0 | <5 |
| CFCl₂C(CF₃)₂OH | 8 | 100 | 100 | 100 | 90 |
|  | 4 | 100 | 40 | 20 | 85 |
|  | 2 | 40 | 20 | 0 | 15 |
| CF₂ClC(CF₃)₂OH | 8 | 100 | 100 | 100 | 100 |
|  | 4 | 100 | 100 | 100 | 100 |
|  | 2 | 100 | 80 | 60 | 25 |
|  | 1 | 100 | 20 | 0 | 5 |
| CF₃C(CF₃)₂OH | 8 | 100 | 100 | 100 | 100 |
|  | 4 | 100 | 100 | 100 | 45 |
|  | 2 | 100 | 100 | 100 | <10 |
|  | 1 | 20 | 0 | 20 | <5 |
| CClF₂C(CF₂Cl)₂OH | 8 | 100 | 0 | 0 | 100 |
|  | 4 | 100 | 0 | 0 | 100 |
| CH₃C(CF₂Cl)₂OH | 16 | 100 | 0 | 80 | 100 |
| CCl₃C(CF₂Cl)₂OH |  | 0 | 0 | 0 | <10 |
| CCl₂HC(CF₂Cl)₂OH |  | 0 | 0 | 0 | <10 |
| No toxicant |  | 0 | 0 | 0 | 0 |

*CFB=Confused flour beetle; BCB=Black carpet beetle larvae; YMW=Yellow mealworm larvae; NEM=Nematodes.

We claim:
1. The process for controlling noxious insects which comprises subjecting said insects to a toxic amount of vapors of a 2-halomethyl-1,3-polyfluoro-2-propanol of the formula

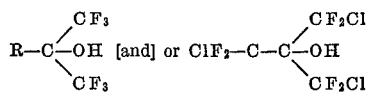

wherein R is a member selected from the group consisting of —CCl₃, —CHCl₂, —CH₂Cl, —CF₃, —CF₂Cl and —CFCl₂.

2. The process according to claim 1 in which the 2-halomethyl-1,3-polyfluoro-2-propanol is 2-trichloromethyl-1,1,1,3,3,3-hexafluoro-2-propanol of the formula

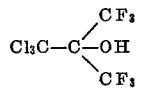

3. The process according to claim 1 in which the 2-halomethyl - 1,3-polyfluoro-2-propanol is 2-trifluoromethyl-1,1,1,3,3,3-hexafluoro-2-propanol of the formula

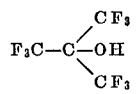

4. The process according to claim 1 in which the 2-halomethyl - 1,3 - polyfluoro - 2-propanol is 2-(difluoromonochloromethyl) - 1,1,1,3,3,3-hexafluoro-2-propanol of the formula

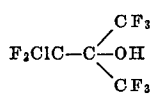

5. The process according to claim 1 in which the 2-halomethyl-1,3-polyfluoro-2-propanol is 2-(monofluorodichloromethyl) - 1,1,1,3,3,3-hexafluoro-2-propanol of the formula

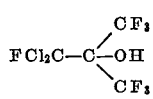

6. The process according to claim 1 in which the 2-halomethyl - 1,3-polyfluoro-2-propanol is 2-dichloromethyl-1,1,1,3,3,3-hexafluoro-2-propanol of the formula

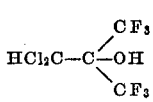

7. The process according to claim 1 in which the 2-halomethyl - 1,3-polyfluoro-2-propanol is 2-monochloromethyl-1,1,1,3,3,3-hexafluoro-2-propanol of the formula

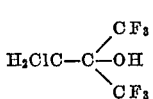

8. The process according to claim 1 in which the 2-halomethyl - 1,3-polyfluoro-2-propanol is 2-difluoromonochloromethyl - 1,1,3,3-tetrafluoro-1,3-dichloro-2-propanol of the formula
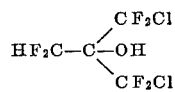
References Cited
UNITED STATES PATENTS
| | | | |
|---|---|---|---|
| 3,129,053 | 4/1964 | Castle | 260—633 X |
| 3,153,004 | 10/1964 | Middleton | 260—633 X |
| 3,227,664 | 1/1966 | Middleton | 260—633 X |
| 3,317,616 | 5/1967 | Weinmayr | 260—633 X |
| 3,560,626 | 2/1971 | Dear et al. | 424—343 |
OTHER REFERENCES
Chemical Abstracts, vol. 67, p. 81759n (1967).
ALBERT T. MEYERS, Primary Examiner
A. J. ROBINSON, Assistant Examiner